United States Patent

[11] 3,607,859

[72] Inventor Joseph Feder
  St. Louis, Mo.
[21] Appl. No. 744,286
[22] Filed June 12, 1968
[45] Patented Sept. 21, 1971
[73] Assignee Monsanto Company
  St. Louis, Mo.

[54] FURYLACRYLOYLGLY-CLYCYL-L-LEUCINAMIDE AND RELATED PEPTIDES AND USE THEREOF IN SPECTROPHOTOMETRIC ASSAY FOR NEUTRAL PROTEASE
7 Claims, No Drawings

[52] U.S. Cl.................................................. 260/112.5,
  195/103.5 R, 260/332.2 A, 260/347.3, 260/309
[51] Int. Cl...................................................C07c 103/52,
  C07d 5/16, G01n 21/34
[50] Field of Search.......................................... 260/112.5

[56] References Cited
OTHER REFERENCES

Bernhard et al., Biochem. (Wash.) 4, 1108– 1118 (1965).
Feder et al., Biochim. Biophys. Res. Commun. 28, 318– 323 (1967).
Fruton et al., J-Biol. Chem. 14S, 253– 265 (1942).

Noller et al., Biochem. (Wash.) 4, 1118– 1126 (1965).
Smith et al., J. Biol. Chem. 176, 835– 841 (1948).
Cyclo Chemical Company (Div. of Travenol Laboratories) Catalog, Biochemicals and Research Organics, Los Angeles, Cal. p. 69.
Feder, Biochem. Biophys. Res. Commun. 32, 326– 332 (1968).

*Primary Examiner*—Lewis Gotts
*Assistant Examiner*—Melvyn Kassenoff
*Attorneys*—Gordon W. Hueschen, Hueschen and Kurlandsky and John D. Upham ABSTRACT: Novel furylacryloylglycyl-L-leucine amide (FAGLA) type compounds. A spectrophotometric assay, based upon hydrolysis of these compounds by neutral protease, is also provided. Compounds have the formula I:

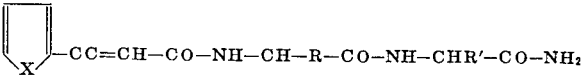

wherein: X is oxygen or sulfur, R is hydrogen or lower-alkyl, and R' is lower-alkyl or phenyllower-alkyl. FAGLA is the preferred compound.

FURYLACRYLOYLGLY-CLYCYL-L-LEUCINAMIDE AND RELATED PEPTIDES AND USE THEREOF IN SPECTROPHOTOMETRIC ASSAY FOR NEUTRAL PROTEASE

BACKGROUND OF THE INVENTION

1. Field of the Invention

Novel organic compounds and spectrophotometric protease determination employing same as substrate.

2. Prior Art

No furylacryloyl polyaminoacid (peptide) amides or thienylacryloyl polyaminoacid (peptide) amides are known. Esters or amides containing furylacryloyl blocking groups are known. Some simple dipeptides have recently been used in kinetic assays for neutral protease. 3-(2-furyl)-acryloyl-glycinamide is a known compound, but of course contains no dipeptide moiety or linkage.

The novel compounds are particularly well adapted to the intended use, as the peptide bond is uniquely split by neutral protease to give a product exhibiting a markedly diminished absorbance at a specifically chosen wavelength, or "perturbation," which is readily detectable spectrophotometrically.

SUMMARY OF THE INVENTION

Compounds of the formula I, wherein X is oxygen or sulfur, the group thus being 2-furyl or 2-thienyl, wherein R is hydrogen or lower-alkyl, and wherein R' is lower-alkyl or phenyllower-alkyl Lower-alkyl for purposes of this application contains 1–4 carbon atoms, and when present in phenyllower-alkyl preferably contains 1–3 carbon atoms. The compounds are advantageously useful as dipeptide substrates for the determination of neutral protease activity according to a spectrophotometric assay procedure also provided by the present invention.

OBJECTS

The provision of the novel compounds of the invention, especially FAGLA, having the utility previously stated, and a novel spectrophotometric assay procedure in which the same are employed as the dipeptide substrate, are some of the objects of the invention. Other objects will become apparent hereinafter, and still others will be obvious to one skilled in the art.

GENERAL DESCRIPTION OF THE INVENTION

The novel compounds of the invention have been already identified and their utility disclosed. Further details of the spectrophotometric process in which they are employed will appear hereinafter. The compounds may be prepared from available starting material by known types of reactions. They may be prepared, for example, by coupling 3-(2-furyl)acryloyl chloride or 3-(2-thienyl)acryloyl chloride, or the corresponding acryloyl-imidazoles, with the selected peptide amide of the formula

HNH—CHR—CO—NH—CHR'—CO—NH$_2$, wherein R and R' are as previously defined, peptide materials are available commercially or are readily obtained by amidation of the selected free acid peptide, which is in turn prepared from the selected amino acids of selected optical activity where an asymmetric a carbon atom is present. The peptide is preferably employed in the form of a saturated aqueous solution and at a pH of about 8 when being coupled with an imidazole reactant, and a saturated dioxane solution when being coupled with an acryloyl chloride reactant. The procedure may be generally that of Bernhard et al., Biochemistry 4, 1108 (1965). Product workup, recovery, and recrystallization is according to usual procedure, preferably after adjustment of pH to about 6. Extraction may be with ethyl acetate of the like. The desired product may be recovered by evaporation of solvent and recrystallization may be from any usual solvent if desired. Alternatively, the product may be used directly without recrystallization by effecting solution thereof in a usual buffer solution of the type in which employed as substrate for spectrophotometric assay. When to be used in the particular assay of this invention, the amino acid shown to the right of the peptide linkage in the structural formula I, that is, the amino acid moiety bearing the amide group, should have the laevo or "L" configuration. As it contains an asymmetric carbon atom, it is of course optically active and may therefore exist in either D or L configurations, or a mixture thereof, depending upon the configuration of the starting peptide amide compound and, before that, the configuration of the amino acid employed in producing the same. The D configuration compounds have other uses, for example, as neutral protease activity inhibitors to prevent autolysis of neutral protease enzymes.

Thus, groups within the scope of R have already been defined. R may representatively be hydrogen, methyl, ethyl, propyl, and butyl, or secondary or tertiary isomers of these groups, but preferably contains a maximum of four carbon atoms. This R' group is preferably isobutyl. These same groups except for hydrogen may be present as R' groups and as the lower alkyl group in phenyllower-alkyl when such radical is present as R'. Representative phenyllower-alkyl groups are benzyl, phenethyl, phenpropyl, and the like, the lower-alkyl group in phenyllower-alkyl preferably having a maximum of three carbon atoms. This group is preferably benzyl, when R' is phenyllower-alkyl.

DESCRIPTION OF THE PREFERRED EMBODIMENTS

The following preparations and examples are given by way of illustration only, and are not to be construed as limiting.

Preparation 1

3-(2-Furyl)acryloyl chloride 3-(2-Furyl)acryloyl chloride is known and may be prepared according to the method of Bernhard et al., Biochemistry 4, 1108 (1965), by the addition of three-times-redistilled SOCl$_2$(1.5 equivalents) to 1.0 equivalent of dry furylacrylic acid which had been twice recrystallized from hot dimethylformamide-water. The mixture was stirred with a magnetic stirrer and maintained at room temperature for 3 hours. The resulting solution was evaporated in vacuo, and the solid residue extracted with cyclohexane under reflux. The hot cyclohexane extract was decolorized with Norit (activated charcoal) and filtered and cooled to 10° C. Crystals of the acyl halide separated. These were filtered and dried at 10° C., and utilized without further purification in the preparation of furylacryloylimidazole (neutralization equivalent 89.0, Cl-22.9 percent).

Preparation 2

3-(2-Furyl)acryloylimidazole 3-(2-Furyl)acryloylimidazole is known and maybe prepared according to Bernhard et al., loc. cit., by the mixed anhydride method. To 20 mmoles of furylacrylic acid in 50 ml. anhydrous dioxane at 10° C. were added successively 20 mmoles of isobutylchloroformate and 20 mmoles of redistilled triethylamine. After 2 hours the precipitate of the amine hydrochloride was removed by filtration. To the filtrate and dioxane washings was added 20 mmoles of imidazole (dried in vacuo at 40° C.) The solution was allowed to stand at room temperature for 4 hours. The dioxane was removed by flash evaporation in vacuo and solid mass was extracted with 100 ml. anhydrous benzene at 50° C. The benzene solution was then cooled to 10° and the small amount of precipitate which formed was discarded. Crystallization occurred upon addition of Skellysolve B to the benzene solution. These crystals were collected and recrystallized by the same procedure; m.p. 111°–114° C., m.m.p. with furylacryloylimidazole prepared from the acyl halide 111°–114° C.

Preparation 3

3-(2-Thienyl)acryloyl chloride

This product is produced in the manner of preparation 1 but using 2-thienylacrylic acid in place of 2-furylacrylic acid.

Preparation 4

3-(2-Thienyl)acryloylimidazole

This product is produced in the manner of preparation 2 but employing 2-thienylacrylic acid instead of 2-furylacrylic acid.

Example 1

3-(2-Furyl)acryloyl glycyl-L-leucine amide x=O,R=H, R'= isobutyl)

3-(2-Furyl)acryloylglycyl-L-leucine amide is prepared by reaction of 3-(2-furyl)acryloylimidazole with a saturated aqueous solution of glycyl-L-leucine amide (commercial product), Cyclo Chemical Corporation) at pH 8.0 according to the procedure of Bernhard et al., loc. cit., for preparation of 3-(2-furyl)acryloylglycinamide. The solution is adjusted to pH 6.0 with HC1 and the product extracted with ethyl acetate and the solvent evaporated. Alternatively, the product may be dried over sodium sulfate, filtered and precipitated by addition of hexanes. The product may be employed directly or after recrystallization, as from methylene chloride/hexane or like solvents or mixtures of solvents. M.P. 173°–175° C.

| Anal. | Calc. | C 58.62 | H 6.89 | N, 13.68 |
|---|---|---|---|---|
| | Found | 57.27 | 6.60 | 13.43 |
| | | | | 13.65 |
| | | | | 13.42 |

Example 2

3-(2-Furyl)acryloyl glycyl-L-leucine amide (X=O,R=H, R'-isobutyl)

This product is also prepared in dioxane, using a molar excess (based on reactants) of pyridine, according to the procedure of example 1 but using 3-(2-furyl)acryloyl chloride instead of the corresponding imidazole starting material of example 1.

Example 3

3-(2-Furyl)acryloyl-L-alanyl-L-leucine amide (X=0,R=CH$_3$ R'=isobutyl)

This product is produced in the same manner as given in examples 1 or 2, but substituting L-alanyl-L-leucine amide for the glycyl-L-leucine amide used in those examples.

Example 4

3-(2-Furyl)acryloyl glycyl-L-phenyl-alanine amide (X=0,R=H,R'=benzyl)

This product is produced in the same manner as given in examples 1 2, but substituting glycyl-L-phenylalanine amide for the glycyl-L-leucine amide used in those examples.

Example 5

3-(2-Thienyl)acryloylglycol-L-leucine amide (X=S,R=H,R'=isobutyl)

This compound is produced in the manner of example 1, but substituting 3-(2-thienyl)acryloylimidazole for the 3-(2-furyl)acryloylimidazole of that example.

Example 6

3-(2-Thienyl)acryloyl-glycyl-L-leucine amide (X=S,R=H,R'=isobutyl)

This compound is produced in the manner of example 2, but substituting 3-(2-thienyl)acryloyl chloride for the 3-(2-furyl)acryloyl chloride of that example.

Example 7

3-(2-Thienyl)acryloyl-L-alanyl-L-leucine amide (X=S,R=CH$_3$,R'=isobutyl)

This product is produced in the manner of example 3, but substituting 3-(2-thienyl)acryloyl imidazole or chloride for the 3-(2-furyl)acryloylimidazole or chloride of that example.

Example 8

3-(2-Thienyl)acryloylglycyl-L-phenyl alanine amide (X=S,R=H,R'=benzyl)

This product is produced according to the procedure of example 4, but substituting 3-(2-thienyl)acryloylimidazole or chloride for the 3-(2-furyl)acryloylimidazole or chloride used in that example.

SPECTROPHOTOMETRIC ASSAY FOR NEUTRAL PROTEASE

USING COMPOUNDS OF THE INVENTION

Proteolytic activity, and especially neutral protease activity, has been assayed in various ways in the past. These include using protein substrates and measuring trichloroacetic acid soluble material obtained upon digestion, and simple dipeptides in kinetic assays, with monitoring by use of a recording pH stat. However, hydrolysis of a dipeptide does not lend itself to spectrophotometric techniques for routine evaluation. The present assay procedure goes far toward obviating the problems inherent in and objections to previously available procedure because of the unique adaptability of the compounds of the invention as substrates for use therein.

EXPERIMENTAL

Materials and Methods

Furylacryloylglycyl-L-Leucine amide (FAGLA) was prepared and stock solutions of this compound made up in pH 7.22 phosphate buffer (ionic strength =0.1) at a concentration of $2.49 \times 10^{13}$M (76.6 mg./100 ml.). This buffer, trisbuffer, trismaleate buffer, or cacodylate buffer, as well as others, can be used. Likewise, small changes in pH can be made. These must, however, be consistently maintained in establishing a standard curve and for the comparison of different samples.

Crystalline subtilisin was purchased. Neutral protease from *Bacillus subtilis* fermentation beers without traces of subtilisin activity was used. Protease determinations using casein substrate were carried out as described by Anson, J. Gen. Physiol. 22, 79 (1938).

The hydrolysis at 25° C. of FAGLA was followed spectrophotometrically using a Cary 14 P.M. recording spectrophotometer and also a Beckman D.U. spectrophotometer. A decrease in absorbance at 345 m$\mu$ was observed as the substrate (FAGLA) is hydrolyzed. The substrate is stable in buffer solutions an can be stored as such. Since the substrate has a considerable absorption at this wave length ($\epsilon_{345m\mu}$ =766), a screen ($A_{345m\mu}$=1.204) was used to blank out some of the absorbance when carrying out reactions in the Cary 14 spectrophotometer. For the Beckman D.U., a blank can be prepared by diluting the substrate with water (3:1) (FAGLA/H$_2$0).

A $\Delta\epsilon_{345}$ of 317 was obtained for the enzyme-catalyzed hydrolysis of this substrate. In all studies the reaction vessel contained 3.0 ml. of buffer-substrate solution and 0.1 ml. of enzyme. These amounts can also be varied as long as consistency in analyses is maintained.

RESULTS

Three methods have been used to assay for neutral protease activity using FAGLA.

The first involves calculation of a pseudofirst-order rate constant from the reaction data and the other tow represent initial rate methods.

1. When S<<Km, the rate equation for an enzyme-catalyzed reaction becomes $$v = \frac{\text{kcat (EO)(S)}}{\text{Km}}$$

yielding a pseudo first-order rate constant $k$ equal to $kcat/Km$ ($E°$). A plot of $k$ versus ($E°$) should be linear and the slope $kcat/Km$ is characteristic for this enzyme under this condition and can be used to calculate the enzyme concentration from other values of $k$. The $Km$ for this reaction was found to be about $293 \times 10^{12}$M. Since the reactions were carried out at a substrate concentration of $2.49 \times 10^{13}$M, one would expect good pseudofirst-order kinetics which indeed were observed. The data was evaluated using infinity plots and the modified Guggenheim method of F. J. Kezdy et al., Bull. Soc. Chim. Belges. 67, 687 (1958), and the plots were linear for more than 95 percent of the reaction with excellent agreement between methods. A linear relationship was obtained over a 40-fold range of enzyme concentration. 2. The initial rate of hydrolysis of the substrate as reflected by the initial change in absorbance at 345 mμ/sec. was directly proportional to the enzyme concentration over greater than a 100-fold range in enzyme concentration. 3. Finally, a simple two-point initial rate assay for the Beckman D.U. spectrophotometer was devised using the same conditions as described for the previous methods. To 3.0 ml. of substrate-buffer was added 0.1 ml. of enzyme solution and the absorbance at 345 mμ was read 30 seconds after mixing. Three minutes later the absorbance was read again.

The ΔA345/3 min. was proportional to the enzyme concentration expressed as casein protease units per ml. of solution (Anson method).

This method 3 represents the lead refined and analytically perfect method, but one still obtains good linearity between enzyme concentration and activity. One can measure as little as 10 protease (casein) units per ml. in the reaction solution.

The neutral protease tested had an initial rate on a per mg. of enzyme basis which was 890-fold that for the perin hydrolase subtilisin. Both trypsin and chymotrypsin were totally inactive toward catalyzing the hydrolysis of FAGLA.

In summary, furylacryloylglycyl-L-leucine amide as a substrate of choice specific for neutral protease. It incorporates ease of measuring the reaction with stability in buffer, together with a specificity function which permits assay of the neutral protease in the presence of other proteases.

When the spectrophotometric assay was carried out using the related compounds of example 3–8 instead of FAGLA, substantially identical results were obtained, showing their adaptability to and utilization in the procedure in place of FAGLA. Moreover, the test procedure has been applied with facility in the assay of other neutral proteases, especially of bacterial origin, such as thermolysin or thermoase (Daiwa Kasei as source.).

It is to be understood that the invention is not to be limited to the exact details of operation or exact compounds, compositions, or procedures shown and described, and the invention is therefore to be limited only by the full scope of the appended claims:

1. Compound of the formula:

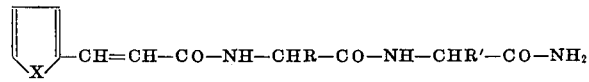

wherein:
X is selected from the group consisting of oxygen and sulfur,
R is selected from the group consisting of hydrogen and lower-alkyl, and
R' is selected from the group consisting of of 2-methylpropyl and benzyl,
wherein lower-alkyl contains a maximum of four carbon atoms and wherein the amino acid residue of the R'-containing moiety has the L-configuration and wherein the R-containing moiety has the L-configuration when R is other than hydrogen.

2. Compound of claim 1 which is 3-(2-Furyl)acryloylglycyl-L-leucine Furyl)acryloylglycyl-L-leucine amide.
3. Compound of claim 1 which is 3-(2-Furyl)acryloyl-L-alanyl-L-leucine amide.
4. Compound of claim 1 which is 3-(2-Furyl)acryloylglycyl-L-phenylanine amide.
5. Compound of claim 1 which is 3-(2-Thienyl)acryloyl-glycyl-L-leucine amide.
6. Compound of claim 1 which is 3-(2-Thienyl)acryloyl-L-alanyl-L-leucine amide.
7. Compound of claim 1 which is 3-(2-Thienyl)acryloyl-glycyl-L-phenylalanine amide.

MONSANTO E-22     S.N.  744,286

UNITED STATES PATENT OFFICE
CERTIFICATE OF CORRECTION

Patent No. __3,607,859__     Dated __September 21, 1971__

Inventor(s) __Joseph Feder__

It is certified that error appears in the above-identified patent and that said Letters Patent are hereby corrected as shown below:

| | |
|---|---|
| Abstract, Formula 1 | 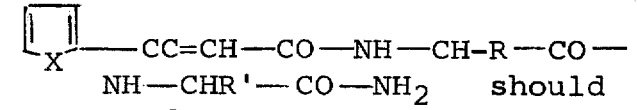 should |
| Application, Abstract  Formula 1 | read  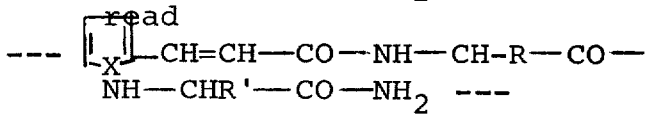 |
| Column 1, line 29  Application Page 1, line 22 | "phenyllower-alkyl" should read ---phenyl-lower alkyl.--- |
| Column 1, line 64  Application Page 2, line 19 | "asymmetric a carbon" should read ---asymmetric carbon--- |
| Column 1, line 73  Application Page 2, line 27 | "of the like" should read ---or the like--- |
| Column 2, line 53  Application Page 4, line 20 | "maybe" should read ---may be--- |
| Column 3, line 5  Application Page 5, line 14 | "x=O" should read ---X=O--- |
| Column 3, line 10  Application Page 5, line 17 | "product)" should read ---product,--- |

ORM PO-1050 (10-69)

UNITED STATES PATENT OFFICE
CERTIFICATE OF CORRECTION

Patent No. 3,607,859    Dated September 21, 1971

Inventor(s) Joseph Feder

It is certified that error appears in the above-identified patent and that said Letters Patent are hereby corrected as shown below:

| | |
|---|---|
| Column 3, line 37, Example 3<br>Application Page 6, line 8<br>  Example 3 | "...R=CH$_3$..." should read<br>---...R=CH$_3$,...--- |
| Column 3, line 47, Example 4<br>Application Page 6, line 15<br>  Example 4 | "12" should read<br>--- 1 and 2--- |
| Column 3, line 50, Example 5<br>Application Page 6, line 17 | "...acryloylglycol-L-..." should read<br>---...acryloylglycyl-L-...--- |
| Column 4, line 23<br>Application Page 8, line 19 | "...2.49X10$^{13}$M..." should read<br>---...2.49X10$^{-3}$M...--- |
| Column 4, line 39<br>Application Page 9, line 1 | "an" should read<br>---and--- |
| Column 4, line 56<br>Application Page 9, line 16 | "pseudofirst-order" should read<br>---pseudo-first order--- |
| Column 4, line 57<br>Application Page 9, line 17 | "tow" should read<br>---two--- |
| Column 4, line 69<br>Application Page 9, line 25 | "293X10$^{12}$M"$_2$ should read<br>---2.93X10$^{-2}$M--- |

UNITED STATES PATENT OFFICE
CERTIFICATE OF CORRECTION

Patent No. 3,607,859  Dated September 21, 1971

Inventor(s) Joseph Feder

It is certified that error appears in the above-identified patent and that said Letters Patent are hereby corrected as shown below:

| | |
|---|---|
| Column 4, line 70<br>Application Page 9, line 27 | "$2.49 \times 10^{13} M$" should read<br>---$2.49 \times 10^{-3} M$--- |
| Column 4, line 71<br>Application Page 9, line 27 | "pseudofirst-order" should read<br>---pseudo-first order--- |
| Column 5, line 16<br>Application Page 10, line 14 | "lead" should read<br>---least--- |
| Column 5, line 24<br>Application Page 10, line 24 | "as" should read<br>---is--- |
| Column 5, line 30<br>Application Page 10, line 29 | "example 3-8" should read<br>---examples 3-8--- |
| Claim 1, Column 6, line 17<br>Application, Claim 1, line 7 | "consisting of of" should read<br>---consisting of--- |
| Claim 2, Column 6, line 24<br>Application, Claim 2 | Delete as printed in patent.<br>Claim 2 should read<br>---Compound of Claim 1 which is 3-(2-Furyl)acryloylglycyl-L-leucine amide--- |
| Claim 4, Column 6, line 28<br>Application, Claim 7, line 2 | "L-phenylanine amide." should read<br>---L-phenylalanine amide--- |

Correct Title to read -- FURYLACRYLOYLGLYCYL-L-LEUCINE AMIDE (FAGLA) TYPE COMPOUNDS AND USE THEREOF IN SPECTROPHOTOMETRIC ASSAY FOR NEUTRAL PROTEASE --

Signed and sealed this 29th day of August 1972.

(SEAL)
Attest:

EDWARD M. FLETCHER, JR.
Attesting Officer

ROBERT GOTTSCHALK
Commissioner of Patents